Nov. 6, 1923.

W. HAMER 1,472,831

APPARATUS FOR COOLING PURPOSES

Filed June 7, 1922

Inventor:
W. Hamer

By Marks&Clerk
Atty's

Patented Nov. 6, 1923.  1,472,831

UNITED STATES PATENT OFFICE.

WALTER HAMER, OF DEVONPORT, AUCKLAND, NEW ZEALAND.

APPARATUS FOR COOLING PURPOSES.

Application filed June 7, 1922. Serial No. 566,666.

*To all whom it may concern:*

Be it known that WALTER HAMER, a citizen of the British Empire, residing at Devonport, Auckland, New Zealand, has invented certain new and useful Improvements in Apparatus for Cooling Purposes, of which the following is a specification.

Figure 1:
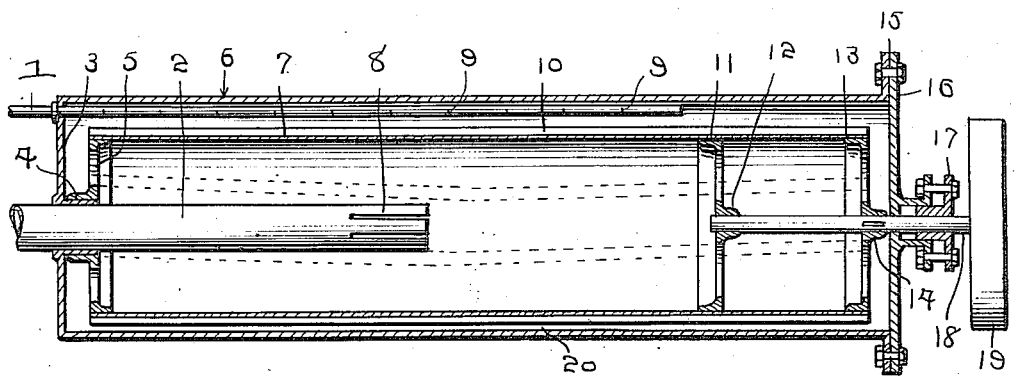
Figure 2:
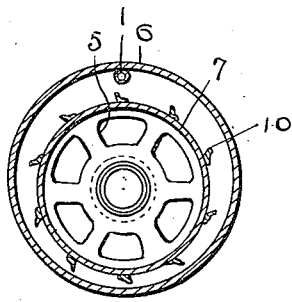

This invention relates to apparatus for cooling purposes in particular milk and other fluids, in which ammonia or the like is used. The introduction of ammonia from the usual compressor and condenser into a closed horizontally disposed cylinder through a perforated pipe therein whereby the cylinder is cooled and itself cools substances near or brought into contact with it and then drawing off by suction the vaporized ammonia back to the compressor are known. By such a device however it is found that a considerable quantity of liquid ammonia collects in the lowest part of the cylinder and it takes considerable time with the corresponding expense for wages and running machinery to remove it by the use of warm water in the usual way. By my invention the most of this expense is saved and the ammonia is used to better effect and more completely. My invention has for its leading feature a drum adapted to be revolved within the cylinder above referred to and also provided with longitudinal blades specially arranged and adapted to pick or scoop up any liquid ammonia that may find its way to the lowest part of the cylinder and distribute it over the drum. A feature also is the introduction from the compressor and condenser of the ammonia by means of a small pipe laid within the cylinder close to the upper surface for the greater part of its length, such pipe having perforations or slits along it preferably at the side. The drum is also mounted preferably eccentrically within the cylinder. In the accompanying drawings illustrating the invention Figure 1 is a longitudinal section of the apparatus and Figure 2 is a cross section of same. Referring to these drawings, there is a horizontally disposed cylinder 6 having closed ends 3 and 16. Within this cylinder a revolving drum 7 is eccentrically mounted. One end of the drum is provided with an apertured plate 5 having a sleeve 4 rotating on a boss extending inwardly from the plate 3. The other end of the drum is provided with an apertured plate 13 having a boss 14 keyed to a shaft 18 which extends through a stuffing box 17 provided on the plate 16. The plate 16 is secured to a flange at one end of the cylinder 6, as shown at 15. The shaft 18 is revolved by a driving pulley 19 driven by any suitable prime mover (not shown). An apertured plate 11 is arranged within the drum a short distance from one end of the same and it is provided with a boss 12 to support the inner end of the shaft 18.

A small inlet pipe 1 having saw cuts 9 at one side leads ammonia from the usual compressor (not shown) within and to nearly the end of the cylinder and is located preferably near the inside upper surface thereof as shown. A suction pipe 2 operated in the usual manner to draw out the vaporized ammonia back to the compressor passes through a central outlet in the drum. This pipe 2 extends preferably half way within the drum 7 and has slots 8 at its inner end for the entry of the vaporized ammonia. Blades 10 are disposed lengthwise along the drum and are inclined from each end thereof downwards to the centre of the drum. In operation the ammonia from the compressor and condenser enters the cylinder 6 through the small inlet pipe 1 and is ejected therefrom through the slits 9 over the drum 7 which is revolved by the driving pulley 19 and shaft 18 over which it is further spread by the blades 10. Vaporized ammonia is drawn through the openings 5 at each end of the drum and through slots 8 and outlet pipe 2 back to the compressor in the usual way. Any liquid ammonia that may reach the lower part 20 of the cylinder is scooped up by the blades 10 of the revolving drum 7 and raised and distributed thereover again.

The material to be cooled is brought near or into contact with the cylinder 6. For instance, if milk is undergoing treatment, the milk is distributed through a perforated receptacle onto the upper side of the cylinder and as it flows downwardly it will be cooled, and finally drop off into a receptacle placed below the cylinder.

I claim—

1. A cooling apparatus including a closed casing, a distributing pipe extending into said casing and adapted to convey a cooling medium to the interior of the casing, a suction pipe for withdrawing the cooling medium from the casing, and a rotatable drum eccentrically mounted in the casing and provided with blades for elevating any liquefied cooling medium which may be deposited in the lower portion of said casing.

2. A cooling apparatus as claimed in claim 1 in which each of said blades is tangentially arranged on the drum to facilitate lifting the liquid cooling medium.

3. A cooling apparatus including a hollow cylinder having closed ends, a pipe extending into said cylinder, extending along substantially the entire length of the interior of the cylinder and provided with perforations adapted to discharge a cooling medium into the cylinder, a suction pipe arranged eccentrically within the cylinder and adapted to permit withdrawal of the cooling medium from the cylinder, a shaft rotatably mounted in one end of the cylinder, a drum mounted on said shaft and on said suction pipe and arranged eccentrically within the cylinder, a head arranged within the cylinder and engaging the inner end of the shaft, and inclined blades arranged on the periphery of the drum and extending lengthwise of the latter for elevating any liquefied cooling medium which may be deposited in the lower portion of said cylinder.

In testimony whereof he has affixed his signature in presence of two witnesses.

WALTER HAMER.

Witnesses:
ANDREW JOHN PARK,
INEZ LILIAN FLEMING.